Figure 1:
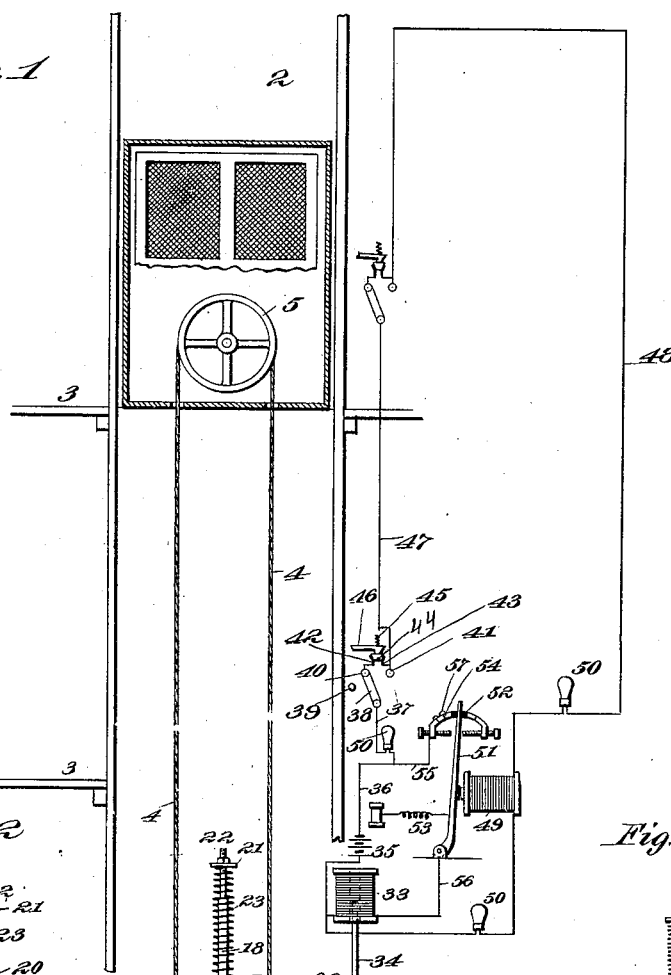

No. 705,479. Patented July 22, 1902.
S. D. STROHM.
SAFETY DEVICE FOR ELEVATORS.
(Application filed Apr. 4, 1896.)
(No Model.) 5 Sheets—Sheet 1.

Witnesses.

Inventor
Samuel D. Strohm
by R. A. Morrison
Att'y.

No. 705,479. Patented July 22, 1902.
S. D. STROHM.
SAFETY DEVICE FOR ELEVATORS.
(Application filed Apr. 4, 1896.)
(No Model.) 5 Sheets—Sheet 2.
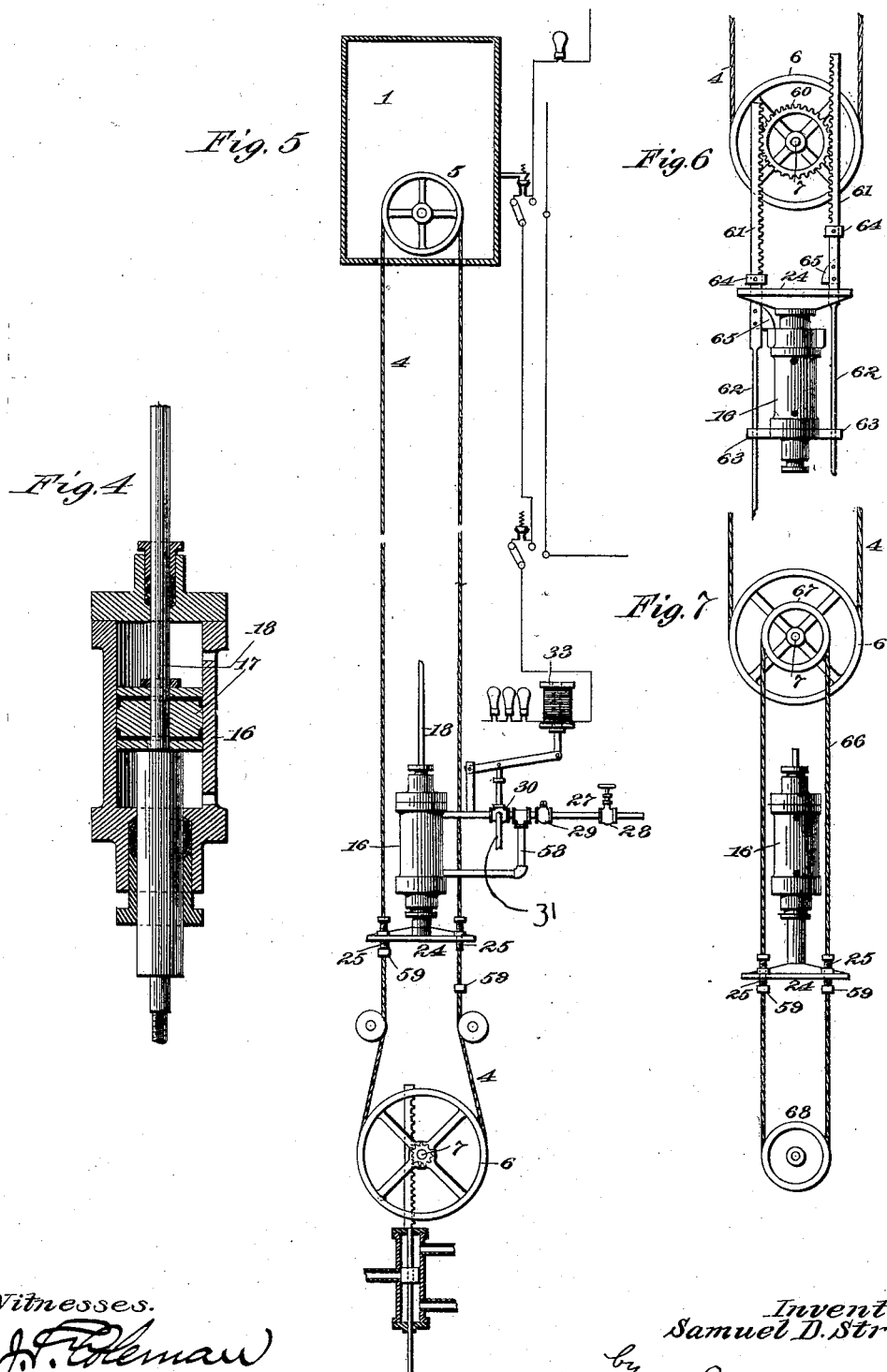
Witnesses.
Inventor
Samuel D. Strohm
by
R. A. Morrison
Atty

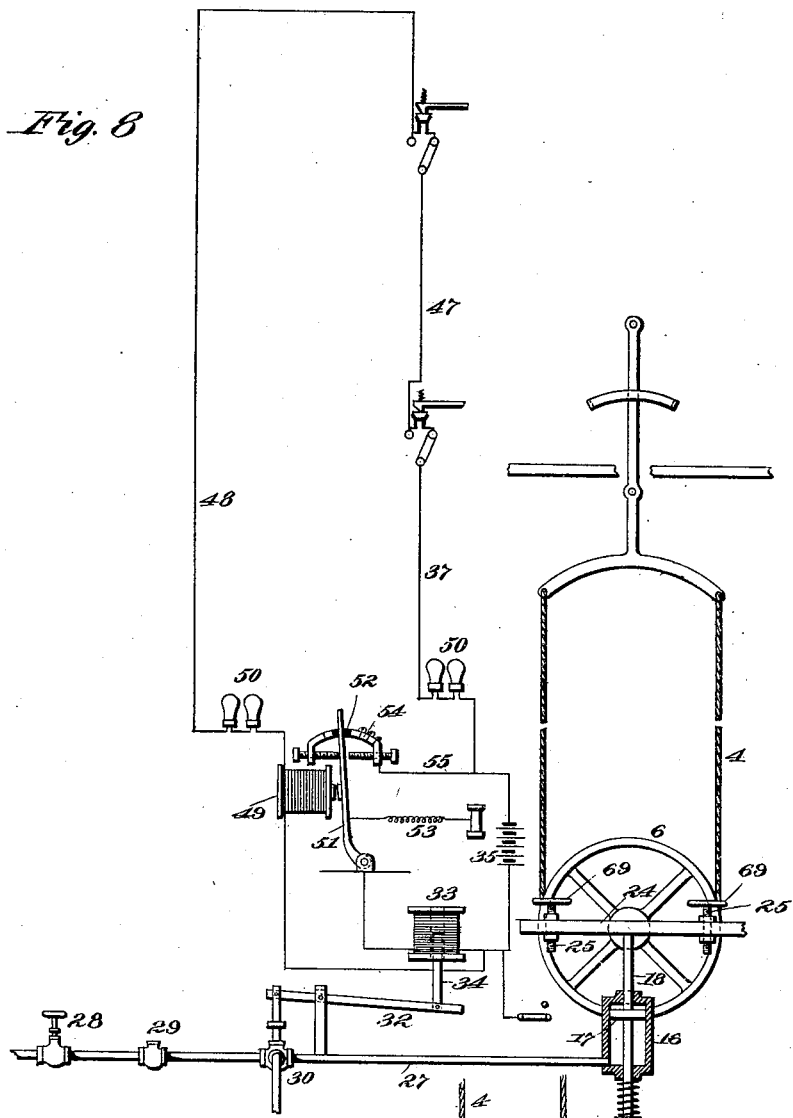

No. 705,479. Patented July 22, 1902.
S. D. STROHM.
SAFETY DEVICE FOR ELEVATORS.
(Application filed Apr. 4, 1898.)
(No Model.) 5 Sheets—Sheet 4.

Witnesses.
Inventor
Samuel D. Strohm
By R. A. Morrison
Atty.

No. 705,479. Patented July 22, 1902.
S. D. STROHM.
SAFETY DEVICE FOR ELEVATORS.
(Application filed Apr. 4, 1896.)
(No Model.) 5 Sheets—Sheet 5.
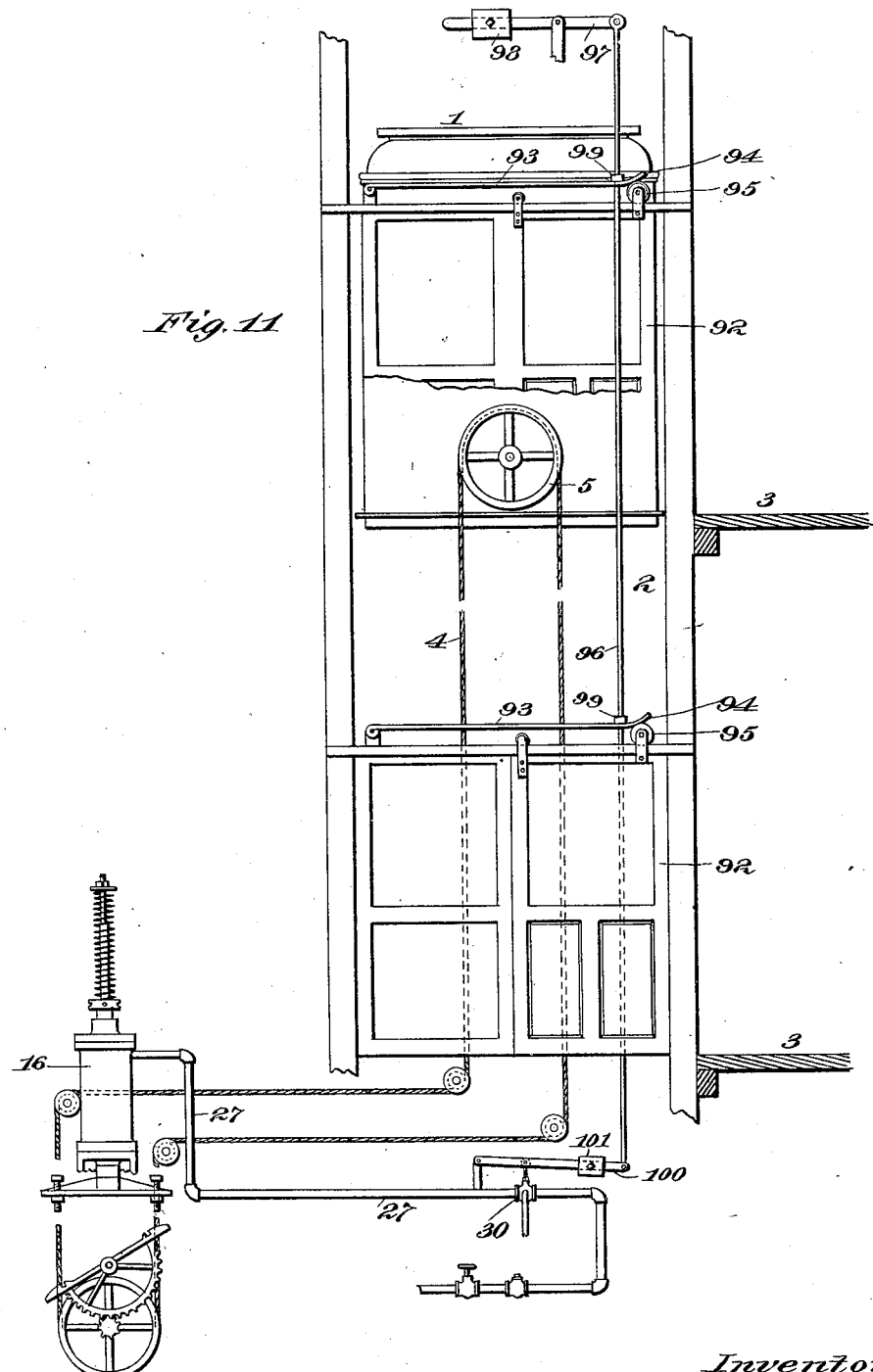

UNITED STATES PATENT OFFICE.

SAMUEL D. STROHM, OF PHILADELPHIA, PENNSYLVANIA, ASSIGNOR TO STROHM ELEVATOR SAFETY DEVICE COMPANY, OF PHILADELPHIA, PENNSYLVANIA, A CORPORATION OF NEW JERSEY.

SAFETY DEVICE FOR ELEVATORS.

SPECIFICATION forming part of Letters Patent No. 705,479, dated July 22, 1902.

Application filed April 4, 1896. Serial No. 586,212. (No model.)

*To all whom it may concern:*

Be it known that I, SAMUEL D. STROHM, a citizen of the United States, residing at Philadelphia, in the county of Philadelphia and State of Pennsylvania, have invented certain new and useful Improvements in Safety Devices for Elevators, (Case B;) and I do hereby declare the following to be a full, clear, and exact description of the invention, which will enable others skilled in the art to which it appertains to make and use the same.

My invention relates to various new and useful improvements in safety devices for elevators, which improvements are designed more particularly for use with passenger-elevators.

The object of the invention is to provide a device or devices capable of attachment to and employment with any type of elevator operated by any power and by means of which absolute safety in operation will be assured. To effect that end I provide electrically or mechanically operated or controlled mechanism, whereby whenever any one or more of the landing-doors (or, if desired, the car-door also) is in an unsafe or insecure condition it will be impossible to start the car and which may be so arranged that the car, if in motion, will be instantly stopped whenever any of said doors is opened or otherwise rendered unsafe or insecure.

With my present invention, therefore, it will be necessary to entirely close the door at the landing where the car is stopped before it can again be put in motion, and it will be impossible also to operate the car when any landing-door has been opened, whereby two very fruitful sources of danger now recognized in the operation of passenger-elevators are overcome.

Instead of employing the safety device in connection with the landing-doors the same may be used with the car-door only, in which case it will be necessary to close the same before the car can be started and by means of which the car will be stopped if the door thereof is opened, whereby another source of danger is overcome.

Preferably I arrange my safety device in such a way that it will be necessary not only to close but also to secure the landing or car door before the car can be put in motion, in which case the electrically or mechanically controlled mechanism will operate in connection with the latch, bolt, lock, or other securing device for the door; but the said device may be so arranged that the closing or shutting of the door alone will render operative the actuating mechanism of the elevator, all as I will fully hereinafter describe and claim.

In order that my invention may be better understood, attention is directed to the accompanying figures, forming a part of this specification, and in which—

Figure 2:
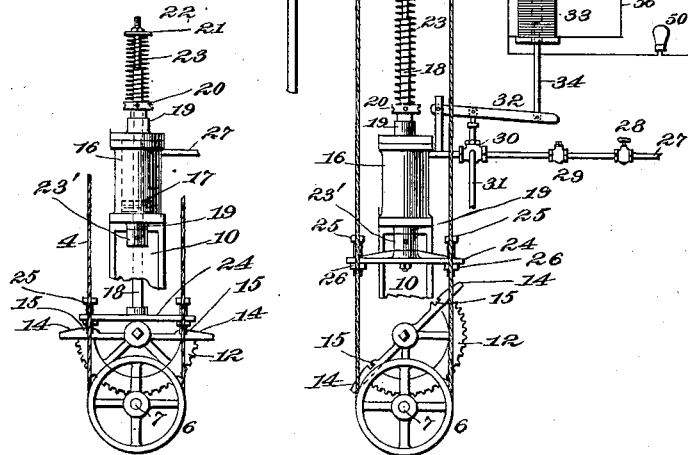
Figure 3:
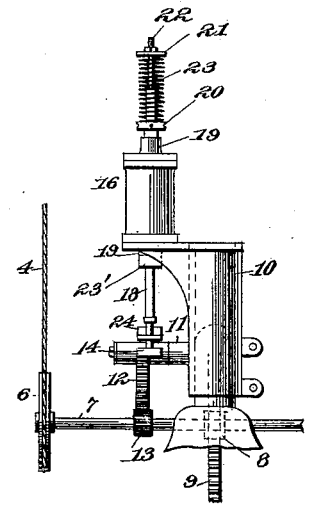
Figure 12:
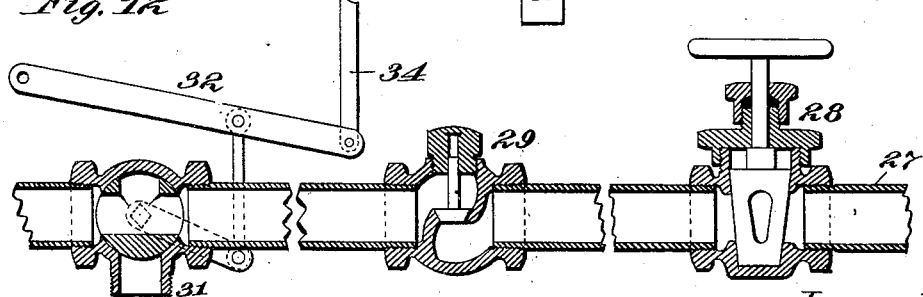

Figure 1 is a diagrammatic view of a well-known form of hydraulic elevator with the operating mechanism removed, showing the preferred arrangement of my improved safety devices and illustrating the parts in their active position; Fig. 2, a front elevation of the valve-controlling mechanism thereof, showing the parts in their inactive position; Fig. 3, a side elevation of the same; Fig. 4, a sectional view of the modified arrangement of controlling-cylinder; Figs. 5, 6, 7, 8, 9, 10, and 11, views of modified forms of devices which will be described in detail; and Fig. 12, an enlarged view of the pipe 27 and valves therein, to be presently described.

In all of the above views corresponding parts are represented by the same reference-numerals.

Referring particularly to the preferred form of apparatus shown in Figs. 1, 2, and 3, 1 represents an elevator car or cage, movable in a shaft 2 past the several landings 3 3 in the ordinary way. 4 is a controlling-rope, operated in this instance by a hand-wheel 5 in the car and passing around the periphery of a pulley 6, keyed to a shaft 7. 8 is a pinion mounted on said shaft, engaging with a rack 9, which rack is connected to the valve of the hydraulic cylinder and controls said valve in any suitable way. The parts described are of well-known construction, and I make no claim to the same. In an apparatus of this kind the parts are so adjusted that when the hand-wheel 5 occupies a central position the valve will be centered and the water will be locked in the main controlling-cylinder, and as said hand-wheel is moved to one side or the other said controlling-cylinder will be put in connection with the pressure or discharge ports of the valve-chest, so as to raise or lower the car. My improved safety devices are used in connection with an elevator of this or any other suitable construction in such a way that absolute safety of operation will be obtained, as will be explained. In the preferable form of apparatus shown in these three views I carry upon the main valve-chest a suitable supporting-bracket 10, having a bearing 11, formed at one side thereof. Mounted upon said bearing 11 is a semicircular rack 12, engaging with a pinion 13, keyed to a shaft 7. The rack 12 carries at its upper end two cam-plates 14, having centering-recesses 15 15 therein.

16 is a cylinder carried on the bracket 10 and having a piston 17 therein. The piston-rod 18 extends through stuffing-boxes 19 19 at the top and bottom of said cylinder and projects some distance above the cylinder, as shown.

20 is the cap-plate of the upper stuffing-box, and 21 is an adjusting-plate engaging with screw-threads at the upper part of the piston-rod, whereby the position of said plate 21 may be adjusted vertically thereon. Between the plates 20 and 21 is a coiled spring 23, the tension of which tends to keep the piston 17 normally elevated in the cylinder 16.

In order to limit the movement of the piston 17, I preferably mount on the piston-rod thereof a collar 23' of the proper length and which comes in contact with the lower stuffing-box when the piston is in its uppermost position, and thereby determines that position.

24 is a cross-head carried at the lower end of the piston-rod 18 and having adjusting-screws 25 25 at the ends thereof. The position of these screws 25 in said cross-head may be readily adjusted, and said screws may be held securely in any position by means of lock-nuts 26.

By employing the adjusting-screws 25 the relation between the cross-head 24 when at its lowermost position and the cam-plates 14 can be very accurately regulated, and hence the closing of the controlling-valve be effected with the greatest nicety. This is of importance, because by reason of the packing of the valve wearing away in use provision must be made for the adjustment of the parts.

27 is a supply-pipe preferably connected with the actuating-pump, which pipe leads into the cylinder 16 at the upper end thereof. If desired, the said supply-pipe may be connected to an air-chamber in which compressed air is stored or it may receive any other fluid or gas under pressure. This pipe is provided with a supply-valve 28 therein, with a check-valve 29, and with a three-way valve 30, said three-way valve normally connecting the interior of the cylinder 16 with the discharge-pipe 31, but is arranged when moved to cut out the discharge-pipe and to connect said cylinder with the pressure-supply. The stem of the valve 30 connects with a lever 32, which is adapted to be operated by a solenoid 33 or any other suitable device. When a solenoid is used, the core 34 thereof may be connected directly with the said lever 32. Said solenoid or other controlling device is adapted to be under the control of circuit breakers or closers adjacent either to the landing-doors or to the elevator-car door, or to both, and adapted to be operated when any one or all of said doors is or are in an unsafe or insecure condition.

In Fig. 1 I illustrate diagrammatically means whereby it is necessary not only to close the landing-doors before the parts are put in their operative position, but to actually secure the same; but I am not to be limited to the same, since other means may be used, operated in other ways, such as by the mere closing of the doors.

35 is a suitable source of electric supply, which may be either a battery or the supply-mains of a building. A wire 36 leads from one side of the supply to a branch 37, thence to a switch-arm 38 on the first landing, which switch-arm is preferably concealed and may be operated by a key or in any other suitable way. Said switch-arm is adapted to make contact with the contact-plates 39, 40, and 41. The contact-plate 39 may be grounded or be a dead plate, so as to cut out the circuits when desired. The plate 40 is connected to a contact-spring 42, carried adjacent to the lock of the door. 43 is another contact-spring adjacent thereto, and 44 is a contact-plate held normally out of engagement with said contact-springs by a spring 45, but adapted to be forced into contact with said contact-springs by the keeper or latch 46 of the door when the same is secured, so as to complete the circuit between the contact-plates 42 and 43. The plate 41 is connected to the contact-spring 43, so that the switch-arm 38 may be moved upon said plate 41 to cut out the circuit-breaker at any of the landings when any one of the circuit-breakers is disabled. From the contact-spring 43 a wire 47 extends to the floor above and through a similar circuit-closing device and thence in series throughout all the floors of the building. From the circuit-closer on the top floor a wire 48 returns through a relay-magnet 49 to the other side of the source of current-supply. If desired, resistances 50 50 may be interposed in the circuit above described.

The arm 51 of the relay is normally held on the insulated section 52 by the attraction of the magnet 49, since the primary circuit of the relay in this instance is normally closed; but when said circuit is broken, as by the unlatching or unfastening of any one or more of the landing-doors or car-doors, said lever 51 is retracted by the spring 53 onto a plate 54. Said plate 54 connects by a wire 55 with the wire 36, so that the secondary circuit of the relay will then be from the source of supply through wires 36 and 55 to the plate 54, through relay-lever 51, wire 56, and through solenoid 33 to the other side of the current-supply. If desired, resistances 57 may be interposed between the plate 54 and the source of supply, so as to prevent sparking.

The operation of the device just described will be readily understood, and is as follows: When all the landing-doors, and also the car-door, if equipped, are closed, the primary circuit of the relay will be closed, energizing the relay-magnet 49 and breaking the secondary circuit through the solenoid 33. In this condition the valve 30 will be closed and the spring 23 will have forced the piston 17 to its uppermost position, whereby the valve-rope 4 may be operated to move the elevator-valve in any direction. If, however, one of the elevator-doors is opened or unlatched or otherwise placed in an unsafe or insecure condition, the primary circuit of the relay will be broken, whereby the magnet thereof will be deënergized. In this case the lever 51 will be retracted by the spring 53 and the current from the source of supply will pass immediately through the solenoid 33, so as to energize the same, elevating the lever 32 and opening the valve 30. The fluid under pressure will then pass from the pipe 27 into the upper end of the cylinder 16, forcing the piston 17 therein downward and causing the adjusting-screws on the cross-head 24 to engage with one or the other of the cam-plates 14, according to which is in the elevated position, so as to throw the rack 12 to its horizontal position, at which time said adjusting-screws 25 will engage in the recesses 15, as shown in Fig. 2. When in this position, the elevator-valve will be closed, so that movement of the car will be arrested. By employing the recesses 15, in which the adjusting-screws will engage when the piston is operated, the parts will be locked very securely together, so as to effectively prevent the possibility of the valve being opened from the car even when the utmost efforts are made to operate the same. This locking of the valve will occur whenever any one of the landing-doors is in an unsafe or insecure condition, and when the elevator is at a landing and the door thereof is open it will be impossible to start the hand-wheel 5 against the pressure in the cylinder 16. To further lock the cross-head 24 in its lowered position, the check-valve 29 is employed, which operates as a positive check to any movements of the piston 17 when the valve 30 is opened. When, however, the landing-door which has been opened is closed, so as to close the safety-circuit through the relay-magnet and to energize the same, the lever-arm 51 will be attracted thereby and moved onto the insulated section 52, so as to break the secondary circuit, deënergize the solenoid 33, and allow the valve to close, putting the cylinder 16 into communication with a discharge-pipe 31. The spring 32 will then return the parts to their former position, so that the elevator-rope will be free to move.

The main features and general principles of my invention being understood from the above description, the operation of the various modified forms illustrated will be readily comprehended.

In Figs. 4 and 5 I illustrate an improved form of controlling-cylinder 16, wherein the spring 23 may be dispensed with. In this form of device the piston-rod 18 below the piston 17 is of a much larger area, so that the operative area of the bottom of the piston will be much less than that of the top thereof. Connecting the pipe 27 behind the valve 30 with the lower end of the piston 16 is a pipe 58. By means of this construction pressure will always be exerted beneath the piston 17, so as to normally keep the same elevated; but when the valve 30 is open and pressure is allowed to enter the upper part of the cylinder the greater area of the top of the piston 17 will overbalance the same and force the cross-head 24 downward. In the form shown in Fig. 5 I dispense with the semicircular rack 15 and its connecting elements and instead secure upon the valve-rope 4 two stops 59 59, with which the adjusting-screws 25 on the cross-head 24 come into engagement when the piston 17 is forced downward, so that said stops will be brought to a horizontal position to close the elevator-valve. In this figure also I dispense with the relay and maintain the solenoid 33 in a constantly-closed circuit which extends through the circuit-breakers at the several landings. In this modification, therefore, the valve 30 is reversed, so that when it is in its elevated position the discharge-pipe 31 will be in communication with the top of the cylinder. When the circuit of the solenoid 33 is broken, said valve will move downward, so as to put the upper part of the cylinder into communication with the pipe 27, as explained.

In Fig. 6 I illustrate a further modification which possesses some features of advantage in special connections. 60 is a gear-wheel mounted on the shaft 7 adjacent to the pulley 6. Engaging with said gear-wheel 60 at each side thereof is a rack 61, said racks having guide-rods 62 at their lower ends working in bearings 63 at the lower end of the cylinder 16. 64 represents stops secured to the racks 61 and with which the cross-head 24, carried on the piston-rod of the cylinder 16, engages, so as to bring said stops 64 in line with each other and close the elevator-valve. In this construction of apparatus I also make use of a lug 65, secured to each rack 64 and adapted to engage with the upper end of the cylinder 16, so as to limit the movement of the parts and prevent the elevator-valve from being opened too far.

In the modified form of figure shown in Fig. 7 an arrangement very similar to that shown in Fig. 5 is employed, except that the stops 59 instead of being secured directly to the valve-rope 4 are secured to a rope 66, which passes around a pulley 67, keyed to the shaft 7, and around an idler 68. It is to be observed that instead of employing ropes for this purpose sprocket-chains may be used, if desired.

Instead of any of the arrangements illustrated the form of device shown in Fig. 8 may be used, which possesses for some cases and under some conditions great superiority, since it is simple and extremely sensitive. In this form of device I mount directly upon the pulley-wheel 6 two stops 69, with which the adjusting-screws 25 of the cross-head 24 are adapted to engage when the piston 17 is operated, so as to bring said stops in line with each other and close the elevator-valve.

In the form of apparatus shown in Fig. 9 I connect the piston-rod 18 by means of a connecting-rod 70 with a disk wheel or similar element 71, to which the valve-rope is connected and which operates the elevator-valve either directly or indirectly. In the position of the parts illustrated the valve is entirely opened to run the car up or down. When the valve 30 is opened, the piston 17 is forced upward, partially rotating the disk 71 and closing the valve, as will be understood.

In all of the forms of my improved devices which have been described above I have illustrated the employment of a cylinder having a piston therein adapted to be moved when a valve is opened, said valve being controlled by an electric device energized or deenergized by the making or breaking of a supply-circuit at any one of the landings. My invention is, however, broader than this and is capable of being carried out in other ways than by the employment of a cylinder, such as will suggest themselves to persons skilled in the art, and in Fig. 10 I illustrate means whereby this may be done. In this form of device I secure a face-wheel 72 on the shaft 7 and provide the said face-wheel with two pins or studs 73, which when brought in line with each other maintain the elevator-valve in its closed position. 74 is a cross-head carried on a lever 75, fulcrumed at 76 and having a pin 77 at its free end. This pin works within a cam-groove 78 in the face of a gear-wheel 79, said gear-wheel meshing with a larger gear-wheel 80, secured to a drum 81, around which a rope 82 is wound, to the lower end of which is attached a weight 83, whereby said drum 81 tends to revolve. Secured to the shaft of said drum is an escapement-wheel 84, having in this instance four teeth 85, and engaging with said escapement-wheel is an escapement 86, controlled by a magnet or magnets 87. In the arrangement of parts shown in this figure the gear-wheel 80 is of twice the diameter of the gear-wheel 79. Instead of providing a circuit-breaker controlled by a latch or bolt of the doors, as I have before described, I illustrate in this figure a circuit-breaker adapted to be operated by the opening and closing of the landing-doors. Said circuit-breaker in this instance consists of an insulated block 88, having contact-springs 89 89 thereon and provided with a metallic plunger 90, which projects into the door-casing and which is adapted to be normally forced back by the closing of the door. Said plunger is provided with an insulated stud 91 thereon, which when the door is opened is brought between the contact-springs 89 89, so as to break the circuit at that point. In order that this may be done, the said plunger 90 is provided with a spring thereon, which normally tends to move the same in the direction of the door when the door opens. In this form of device the circuit is normally closed throughout the circuit-closers at the landing, and the escapement 86 engages with one of the teeth 85. The parts are so adjusted that in this position the cross-head 74 will be retracted from the studs 73, so that the valve-rope 4 may be freely moved to control the elevator-valve. When, however, the circuit to the magnet or magnets 87 is broken at one of the landings, the said magnet or magnets is or are deënergized, disengaging the escapement 86 from the tooth with which it was in engagement and allowing the drum 81 to revolve one-fourth of a revolution, carrying the gear-wheel 79 through half of a revolution and by reason of the cam-groove 76 therein elevating the cross-head 74, so as to bring the studs 73 in line with each other and close the elevator-valve.

Instead of carrying out the general principles of my invention by means of electrical appliances operating in connection with the landing-doors or car-door, as I have explained, it is possible to employ for that purpose mechanical devices operating in an analogous way and which in some instances may be of importance, as by their use the necessity of attending to batteries and the care required to effect the proper insulation and connection of the parts are overcome.

In Fig. 11 I illustrate a convenient form of mechanism showing how the same principles may be carried out in a perfectly practical way by mechanical devices operating in connection with the landing-doors. In this figure, 92 92 represent landing-doors on an elevator-shaft, in which a car 1 travels. Above each landing-door is pivoted a lever 93, having a curved forward end 94. Engaging beneath each lever is a roller 95, carried on each of the landing-doors and so arranged that as any one of the landing-doors is opened the said roller will engage with the lever 93 and elevate the same. 96 is a controlling rope or rod counterbalanced at its upper end by means of a lever 97 and weight 98, said controlling-rope being provided with nuts or other stop devices 99 thereon, with which the levers 93 engage. Preferably said nuts or other stop devices are adjustably secured to the rod 96, so that their position thereon may be properly adjusted. The rod 96 connects at its lower end with a lever 100, normally held in its lowered position by means of a weight 101, said lever being connected with the valve 30, so as to operate the same. In order to illustrate the capabilities of my invention, I show in this figure controlling mechanism of the operating-engine to one side of the elevator-shaft, which is frequently necessary in actual use. In this instance, therefore, the cylinder 16 connects with a pipe 27, which may be of any length, while at the same time the controlling-valve 30 thereof may be located immediately beneath the elevator, so that the controlling rod or rope 96 may be made without any joints or wearing parts. The advantage of this construction will be obvious, because if the valve 30 were located adjacent to the cylinder 16 it would be necessary to employ intermediate connections between said rod 96 and said valve, in which there would be always lost motion and friction, and there would be great danger of the same becoming broken. In operation it will be noted that when the landing-doors are all closed the controlling rope or rod 96 will be at its lowermost position, so as to close the valve 30 and put the cylinder 16 into communication with the overflow-pipe, the parts being thereby in the positions shown in the figure. When, however, any one of the landing-doors is opened, the roller 95 thereof engaging the valve, the lever 93 will elevate the latter, so as to raise the controlling-rod 96 upon the valve 30 and allow water or other fluid under pressure to enter the cylinder 16 and force the cross-head thereof downward, so as to center and thereby close the valve.

Figure 10:
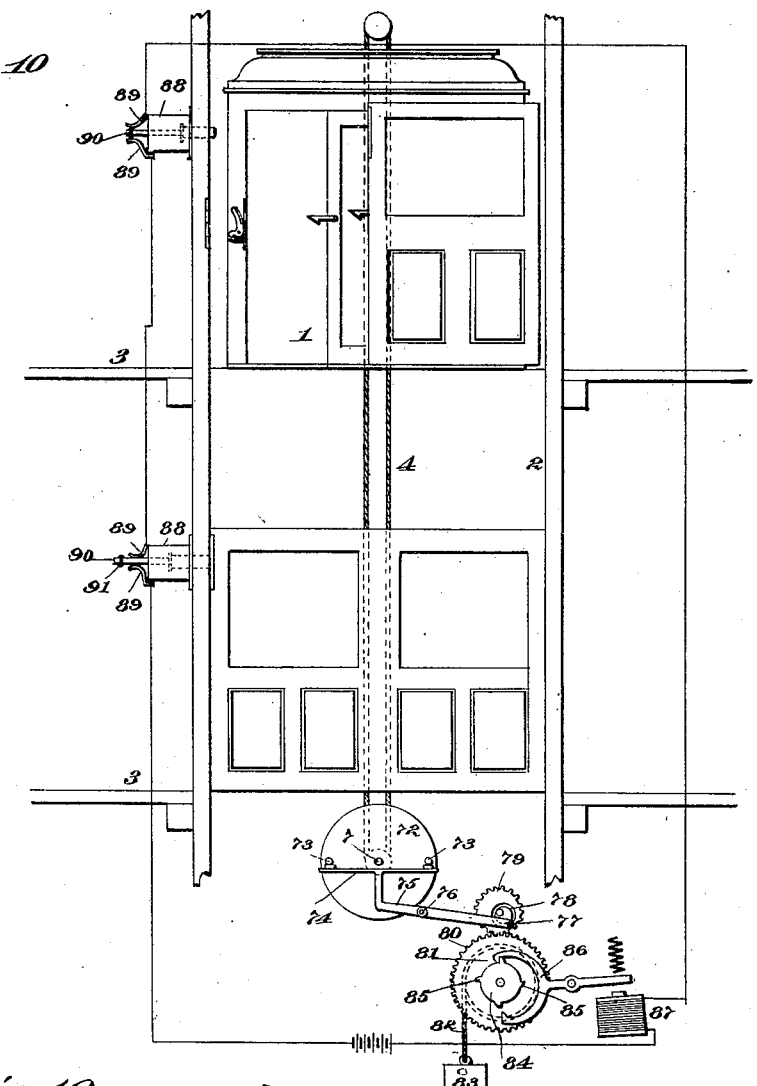

In Figs. 1, 5, 8, and 11 I show the controlling-rope 4 as being movable with the car, in which case it is combined with any of the ordinary compensating devices for maintaining the rope under the requisite tension, and in Fig. 10 the valve-rope is stationary and the car moves in respect to the same, as also is usual. Since the invention does not relate to the mechanism for actuating the valve or other controlling mechanism, I have illustrated the controlling-rope conventionally.

Before claiming my invention I desire to have it understood that many changes may be made therein without departing from the spirit thereof, both mechanically and electrically, and that any suitable kinds of electric breaking and closing devices may be employed and that the invention may be successfully carried out with an open circuit as well as with a closed circuit, in which case it will be noted that instead of arranging the circuit-breakers in series, as shown in the figures, the said circuit-breakers will be arranged in multiple arc, as will be understood.

Having now described my invention, what I claim as new therein, and desire to secure by Letters Patent, is as follows:

1. The combination of an elevator-car and a door, with means for locking said car by fluid-pressure when said door is open.

2. The combination of an elevator-car and a door with means for controlling the power-operating mechanism of said car by fluid-pressure by the opening and closing of said door.

3. A safety device for elevators, comprising a cylinder and a piston therein connecting with the elevator-controlling mechanism, so as to be adapted to move the latter to an inactive position, a valve for said cylinder, and connections between said valve, and a door adjacent to the elevator-shaft, whereby when said door is put in an unsafe or insecure condition, the said valve will be operated, substantially as set forth.

4. A safety device for elevators, comprising a cylinder, a piston therein, a cross-head connected with said piston normally retracted from the elevator-controlling mechanism, but adapted to engage and force the same to an inactive position, a valve for said cylinder, and connections between said valve, and a door adjacent to the elevator-shaft, whereby when said door is put in an unsafe or insecure condition, the valve will be operated, substantially as set forth.

5. A safety device for elevators, comprising a pulley connected with and operating the elevator-valve, a controlling-rope connected to said pulley, two stop-plates connected with said pulley adapted to be brought to a horizontal position so as to turn said pulley to close the elevator-valve, a cylinder mounted above said stop-plates, a piston in said cylinder, a cross-head connected with said piston, normally disengaged from said stop-plates, but adapted to engage the same, a valve for said cylinder, and connections between said valve, and a door opening upon the elevator-shaft, substantially as set forth.

6. In a safety device for elevators, the combination of a pulley 6 connected to and operating the elevator-valve, a controlling-rope for said pulley, a pinion 13 on the pulley-shaft, a semicircular rack 12 engaging with said pinion, cam-plates 14, 14, secured to said rack, a cylinder 16, a piston 17 in said cylinder, a cross-head 24 connected to said piston, adjusting-screws 25, 25, on said cross-head, adapted to engage with said cam-plates 14, a valve 30 for said cylinder, and connections between said valve, and a door opening upon the elevator-shaft, substantially as set forth.

7. In a safety device for elevators, the combination of a pulley 6 connected to and operating the elevator-valve, a controlling-rope for said pulley, a pinion 13 on the pulley-shaft, a semicircular rack 12 engaging with said pinion, cam-plates 14, 14, carried by said semicircular rack, each cam-plate having a recess 15, a cylinder 16, a piston in said cylinder, a cross-head 24 connected to said piston, adjusting-screws 25, 25, on said cross-head, normally disengaged from said cam-plates, but adapted to engage the same, a valve 30 for said cylinder, and connections between said valve, and a door opening upon the elevator-shaft, substantially as set forth.

8. In a safety device for elevators, the combination of a pulley 6 connected to and operating the elevator-valve, a controlling-rope for said pulley, a pinion 13 on the pulley-shaft, a semicircular rack 12 engaging with said pinion, cam-plates 14 carried by said rack, a cylinder 16, a piston in said cylinder, a cross-head 24 carried by said piston, but adapted to engage said cam-plates 14, a spring 23 normally keeping said piston in one position of its travel, a valve 30 for said cylinder, and connections between said valve, and a door opening upon the elevator-shaft, substantially as set forth.

This specification signed and witnessed this 12th day of March, 1896.

SAMUEL D. STROHM.

Witnesses:
FRANK L. DYER,
L. DELLA MCGIRR.